US 11,724,757 B2

(12) United States Patent
Suanno et al.

(10) Patent No.: US 11,724,757 B2
(45) Date of Patent: Aug. 15, 2023

(54) ROLLER FRAME ASSEMBLY IN GROUND-ENGAGING TRACK SYSTEM HAVING ANTI-BACKBENDING ROLLERS AND METHOD

(71) Applicant: Caterpillar Inc., Peoria, IL (US)

(72) Inventors: Gennaro Suanno, Peoria, IL (US); Benoit Abello, Dunlap, IL (US); Michael James Darges, Raleigh, NC (US)

(73) Assignee: Caterpillar Inc., Peoria, IL (US)

( * ) Notice: Subject to any disclaimer, the term of this patent is extended or adjusted under 35 U.S.C. 154(b) by 99 days.

(21) Appl. No.: 17/084,162

(22) Filed: Oct. 29, 2020

(65) Prior Publication Data

US 2022/0135155 A1 May 5, 2022

(51) Int. Cl.
| | |
|---|---|
| *B62D 55/14* | (2006.01) |
| *B62D 55/06* | (2006.01) |
| *B62D 55/20* | (2006.01) |
| *B62D 55/30* | (2006.01) |
| *B62D 55/21* | (2006.01) |

(52) U.S. Cl.
CPC ............. *B62D 55/14* (2013.01); *B62D 55/06* (2013.01); *B62D 55/202* (2013.01); *B62D 55/21* (2013.01); *B62D 55/30* (2013.01)

(58) Field of Classification Search
CPC ...... B62D 55/14; B62D 55/06; B62D 55/202; B62D 55/21; B62D 55/30; B62D 55/15
See application file for complete search history.

(56) References Cited

U.S. PATENT DOCUMENTS

| | | | | |
|---|---|---|---|---|
| 5,045,030 | A | * | 9/1991 | Cunningham ........ F16H 7/1263 474/138 |
| 6,364,438 | B1 | | 4/2002 | Hasselbusch et al. |
| 9,469,357 | B2 | | 10/2016 | Sun |
| 9,988,108 | B2 | | 6/2018 | Tratta et al. |
| 2006/0028066 | A1 | | 2/2006 | Yamamoto |
| 2013/0154347 | A1 | * | 6/2013 | Beasley ................. B62D 55/14 305/153 |
| 2015/0274228 | A1 | * | 10/2015 | Kita ....................... B62D 55/15 305/136 |
| 2016/0288846 | A1 | | 10/2016 | Moyna |
| 2017/0050687 | A1 | * | 2/2017 | Kaufmann .......... B62D 55/088 |
| 2017/0166271 | A1 | | 6/2017 | Hakes et al. |
| 2018/0043948 | A1 | * | 2/2018 | Johnson ................ B62D 55/30 |

FOREIGN PATENT DOCUMENTS

| | | |
|---|---|---|
| EP | 2727802 | 10/2017 |
| JP | 08282554 | 10/1996 |

* cited by examiner

*Primary Examiner* — Minnah L Seoh
*Assistant Examiner* — Abigail R Hymel

(57) ABSTRACT

A ground-engaging track system includes a track roller frame, an idler, and anti-backbending rollers supported by the track roller frame at locations between track rollers and the idler. The anti-backbending rollers define an idler space receiving the idler partially therein and positioned to oppose backbending of a deflection-sensitive section of a ground-engaging track.

17 Claims, 5 Drawing Sheets

ROLLER FRAME ASSEMBLY IN GROUND-ENGAGING TRACK SYSTEM HAVING ANTI-BACKBENDING ROLLERS AND METHOD

TECHNICAL FIELD

The present disclosure relates generally to ground-engaging track systems, and more particularly to an anti-backbending roller in a ground-engaging track system positioned to oppose backbending of a deflection-sensitive track section.

BACKGROUND

Ground-engaging track systems in off-highway equipment are used globally in applications ranging from construction, road building, and forestry to mining, landfills, and many others. In a typical example, an endless loop of track links are arranged in parallel track chains attached to track shoes and extend about a plurality of rotating elements including one or more idlers, track rollers, carrier rollers, and a drive sprocket.

Machines employing such track systems are routinely subjected to extremely harsh operating conditions, including travelling upon hard and/or uneven substrate materials, or soft, yielding substrate materials containing stumps, rocks, debris or other materials. Ground-engaging track systems are also used for machine propulsion upon steep grades and carry machine and material weights of many tons. Track system components are typically designed to be quite robust, and also often serviceable in view of the demanding conditions. Demanding field conditions can also cause uneven or unpredictable wear of the various components, necessitating periodic servicing and/or replacement, if performance is to be maintained. Engineers are routinely seeking improvements and alternative strategies to optimize and/or manage wear and service life, as well as address newly observed or characterized phenomena relating to track system maintenance and performance. One example of a ground-engaging track system is set forth in U.S. Pat. No. 6,364,438 to Hasselbusch et al.

SUMMARY OF THE INVENTION

In one aspect, a ground-engaging track system includes a track roller frame having a front frame end and a back frame end, and an idler recoil assembly mounted to the track roller frame. An idler is supported by the idler recoil assembly at the front frame end, and includes an idler tread surface extending circumferentially around an idler axis. The idler is movable in fore-aft directions between a back stop position, and a forward position. The ground-engaging track system further includes an inboard anti-backbending roller supported by the track roller frame, and an outboard anti-backbending roller supported by the track roller frame. An idler space is defined between the inboard anti-backbending roller and the outboard anti-backbending roller. The idler tread surface is within the idler space at the back stop position of the idler.

In another aspect, a track roller frame assembly includes a track roller frame having a front frame end, a back frame end, an upper frame side, and a lower frame side. An idler is supported for rotation at the front frame end. The track roller frame assembly further includes an inboard anti-backbending roller supported by the track roller frame and having a first half shaft cantilever-supporting a first roller shell having a first roller tread surface and a first roller shell inside face, for rotation about a first roller axis. The track roller frame assembly further includes an outboard anti-backbending roller supported by the track roller frame and including a second half shaft cantilever-supporting a second roller shell having a second roller tread surface and a second roller shell inside face, for rotation about a second roller axis. The first roller shell inside face and the second roller shell inside face define an idler space extending in inboard-outboard directions between the inboard anti-backbending roller and the outboard anti-backbending roller, and the idler is positioned partially within the idler space.

In still another aspect, a method of operating a ground-engaging track system includes advancing a ground-engaging track of coupled together track links attached to track shoes about an idler and track rollers coupled to a track roller frame. The method further includes rotating the idler about an idler axis and rotating the track rollers about track roller axes, based on the advancing of the ground-engaging track. The method further includes urging a deflection-sensitive section of the ground-engaging track extending between the idler and a leading one of the track rollers upwardly based on contact between the deflection-sensitive section and a non-uniformity in at least one of a profile or a composition of an underlying substrate. The method further includes opposing backbending of the deflection-sensitive section with an anti-backbending roller supported by the track roller frame in contact with the ground-engaging track at a location longitudinally between the idler axis and the track roller axis of the leading one of the track rollers.

In still another aspect, a roller for a ground-engaging track system in a machine includes a roller shell having an outer roller tread surface extending circumferentially around a roller axis and axially between a first roller shell axial end having a roller shell inside face, and a second roller shell axial end having a roller shell outside face. The roller shell further includes an inner shell surface extending circumferentially around the roller axis, and forming a journal bore, and a thrust bore extending axially between the journal bore and the roller shell inside face. The roller also includes a roller shaft having a shell support end within the journal bore, and a mounting end projecting outwardly of the second roller shell axial end. A face seal assembly is positioned at least partially within the roller shell at the second roller shell axial end. A thrust flange is attached to the mounting end and positioned within the thrust bore, and a shell cap is attached to the roller shell and positioned at least partially within the thrust bore. A thrust bearing is trapped within the roller and in contact with the thrust flange.

DETAILED DESCRIPTION

Figure 1:
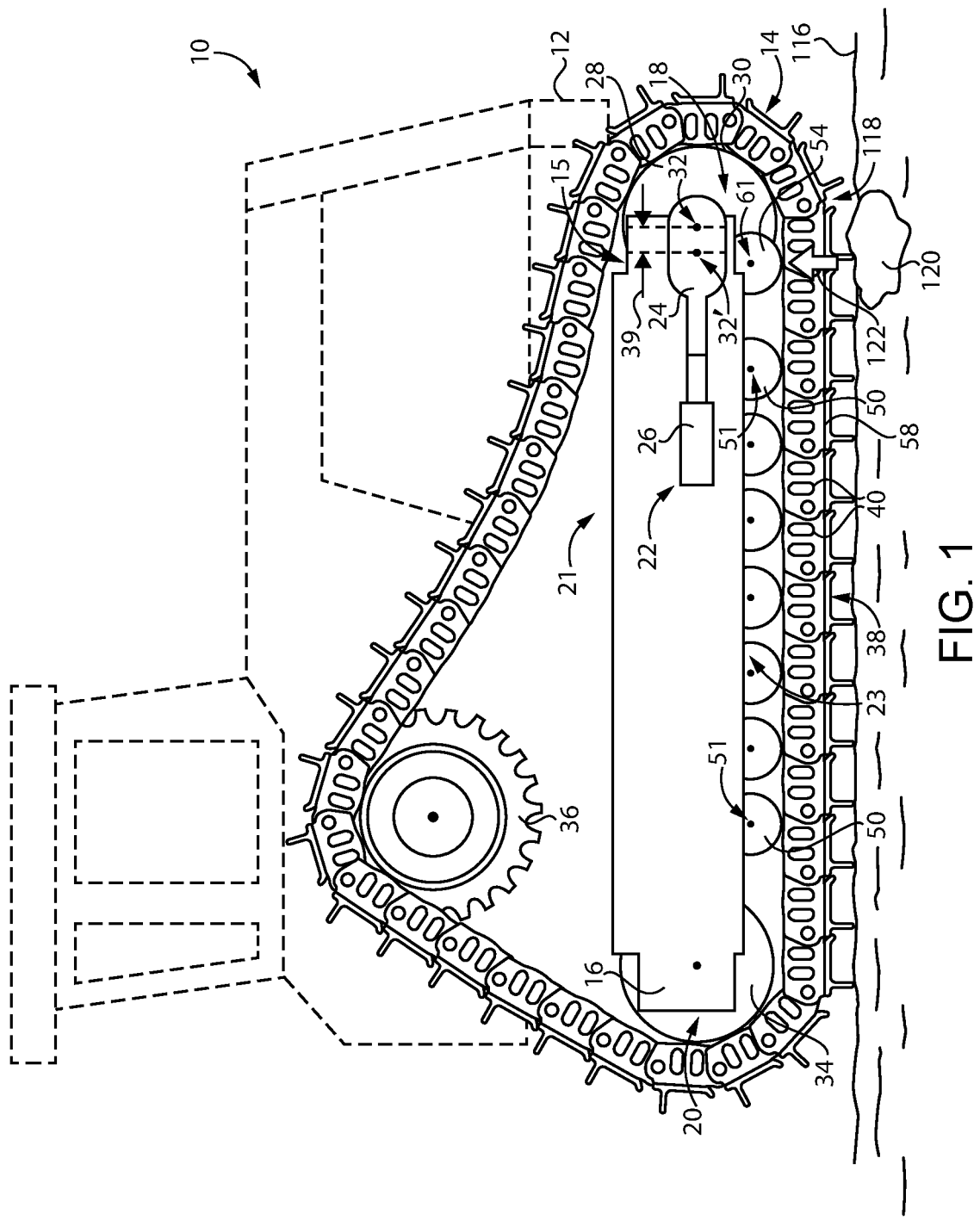
FIG. 1 is a side diagrammatic view of a machine having a ground-engaging track system, according to one embodiment.

Referring to FIG. 1, there is shown a machine 10, according to one embodiment. Machine 10 includes a frame 12, and a ground-engaging track system 14 coupled to frame 12. Ground-engaging track system 14 (hereinafter "track system 14") includes a track roller frame assembly 15 having a track roller frame 16 with a front frame end 18, a back frame end 20, an upper frame side 21, and a lower frame side 23. An idler recoil assembly 22 is mounted to track roller frame 16 and includes a yoke 24 and an actuator 26 coupled with yoke 24. An idler 28 is supported by idler recoil assembly 22 at front frame end 18, and may be mounted for rotation about an idler axis of rotation 32 to yoke 24. Idler recoil assembly 22 supports idler 28 for translational movement in fore-aft directions, between front frame end 18 and back frame end 20, such that idler 28 can move in response to shocks or the like during operation of track system 14 in a generally known manner. Actuator 26 can include a gas spring, a coil spring, or any other suitable actuator or combination of actuators. Idler 28 may be movable in fore-aft directions between a back stop position, for example, where actuator 26 bottoms out or otherwise stops its translational motion, and a forward position approximately as shown in FIG. 1. Idler 28 includes an idler tread surface 30 extending circumferentially around idler axis of rotation 32. Track system 14 may further include a back idler 34, and a drive sprocket 36, with idler 28, back idler 34, and drive sprocket 36 arranged in a so-called "high drive" configuration. In other instances, rotatable track contacting elements of track system 14 could have a different arrangement, such as for an oval track configuration. Track system 14 further includes a ground-engaging track 38 including track links 40 attached to track shoes 58 and forming an endless loop extending around the various rotatable track contacting elements.

Figure 2:
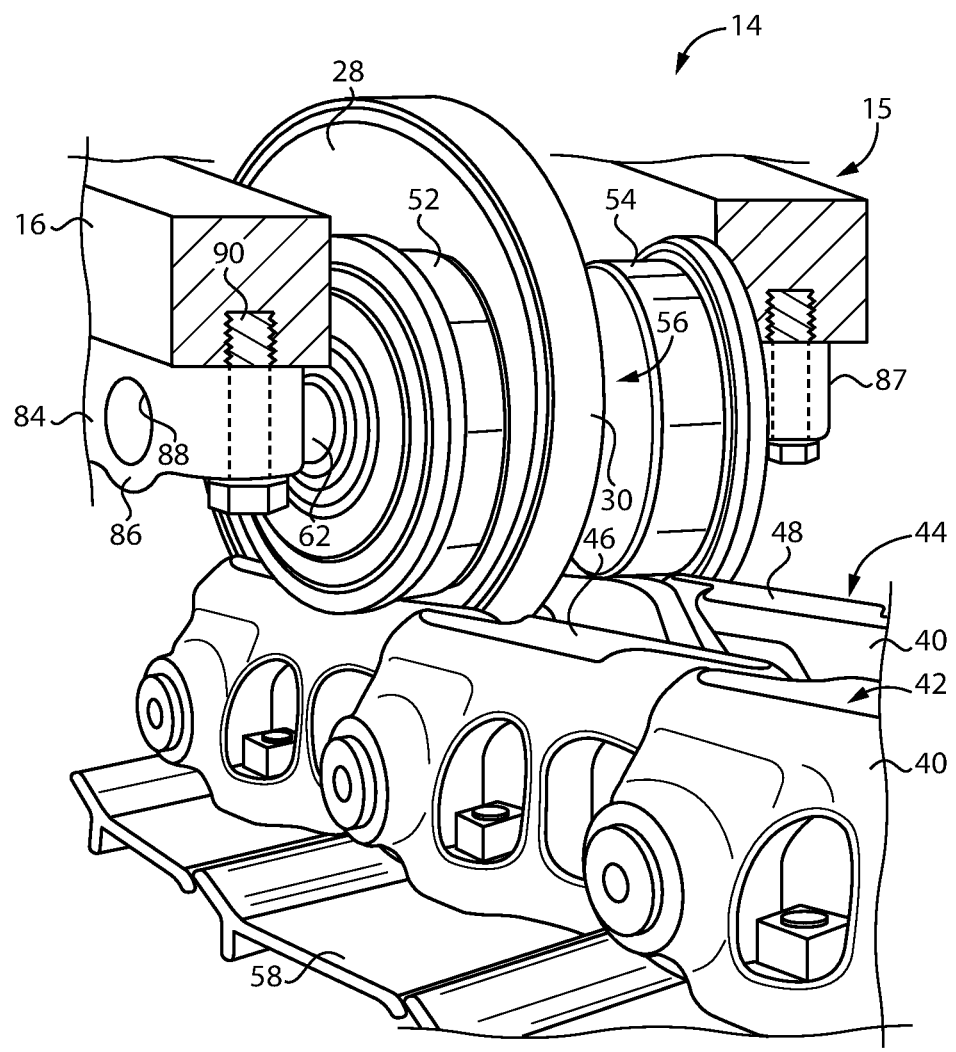
FIG. 2 is a partially sectioned diagrammatic view, in perspective, of a ground-engaging track system, according to one embodiment.

Referring also now to FIG. 2, ground-engaging track 38 can include an inboard track chain 42 of coupled together track links 40 forming an inboard track rail 46, and an outboard track chain 44 of coupled together track links 40 forming an outboard track rail 48. Track shoes 58 may each be attached to both inboard track chain 42 and outboard track chain 44. Machine 10 is shown in the context of a track-type tractor, however, in other embodiments machine 10 might be a track-type loader, a half track, or still another type of off-highway machine. A plurality of track rollers 50 may be coupled to track roller frame 16 at lower frame side 23 and support a majority of a weight of machine 10 in a generally conventional manner. Ground-engaging track 38 includes a deflection-sensitive section 118 extending between idler 28 and a leading one of track rollers 50 as shown in FIG. 1. Based at least in part upon accommodating the fore-aft movement of idler 28 as supported by idler recoil assembly 22, deflection-sensitive section 118 could, without accommodations further discussed herein, be urged upwardly during service to "backbend" in a manner that negatively impacts ride, grading performance, and potentially other parameters. It will be appreciated that deflection-sensitive section 118 is defined based upon what part of ground-engaging track 38 presently extends between idler 28 and the leading or forward one of track rollers 50, and as ground-engaging track 38 is advanced around the various rotatable track contacting elements different parts of ground-engaging track 38 will be understood to be a deflection-sensitive section.

Figure 3:
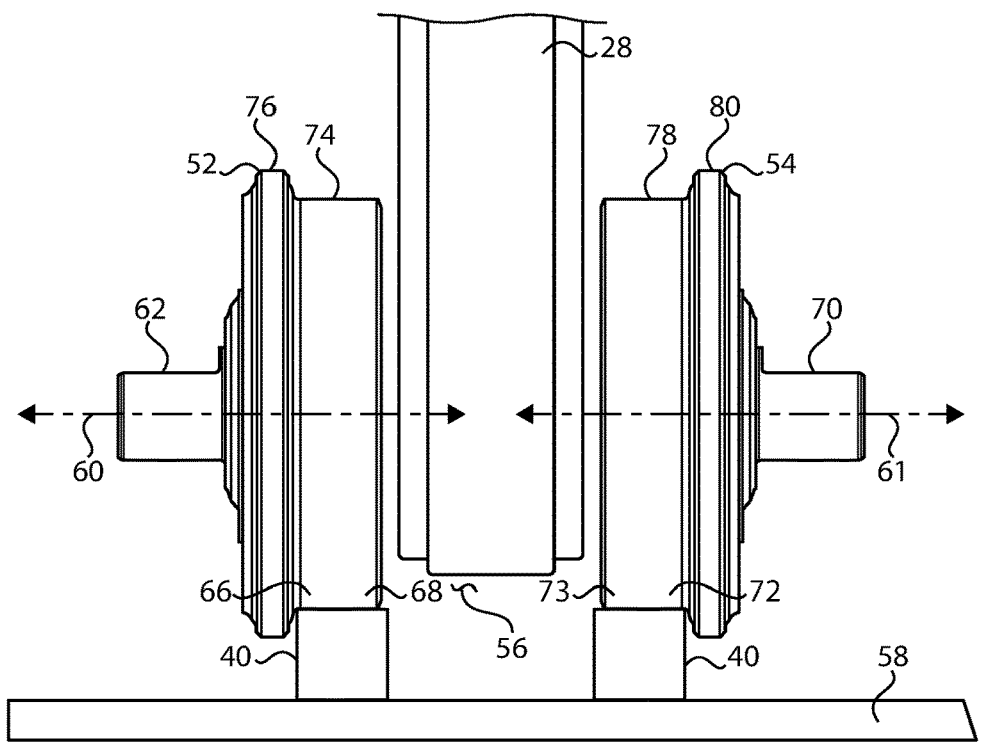
FIG. 3 is a diagrammatic view of a ground-engaging track system, according to one embodiment.

To mitigate or eliminate undesired deflection or so-called "backbending" of ground-engaging track 38, track system 14 includes an inboard anti-backbending roller 52 supported by track roller frame 16, and an outboard anti-backbending roller 54 supported by track roller frame 16. Referring also to FIG. 3, an idler space 56 is defined, in inboard-outboard directions, between inboard anti-backbending roller 52 (hereinafter "roller 52") and outboard anti-backbending roller 54 (hereinafter "roller 54"), and idler 28 is positioned partially within idler space 56. Idler tread surface 30 may be within idler space 56 at the back stop position of idler 28, and may also be within idler space 56 at the forward position of idler 28. In FIG. 1, idler axis 32 is shown approximately as it might be located at the forward position of idler 28, and is shown with reference numeral 32' as it might appear at the back stop position of idler 28. A translation distance 39 between the forward position and the back stop position is also depicted in FIG. 1.

In the illustrated embodiment, roller 52 and roller 54 are freely rotatable relative to one another about a first roller axis 60 and a second roller axis 61, respectively. Roller 52 and roller 54 may be coaxially arranged such that first roller axis 60 and second roller axis 61 are colinear. Roller 52 may include a first half shaft 62 and a first roller shell 66 cantilever-supported by first half shaft 62 for rotation about first roller axis 60. Roller 52 may include a first inside roller shell face 68, which may be located upon an innermost axial end of roller 52. Roller 54 may include a second half shaft 70 and a second roller shell 72 cantilever-supported by second half shaft 70 for rotation about second roller axis 61 and including a second inside roller shell face 73, which may be located upon an innermost axial end of roller 54. It can be seen from the drawings that first inside roller shell face 68 and second inside roller shell face 73 may each be substantially planar and substantially circular, such that idler space 56 is a volume, and as illustrated a cylindrical volume, extending continuously and unobstructed between first inside roller shell face 68 and second inside roller shell face 73.

Roller 52 may further include a first roller tread surface 74 extending circumferentially around first roller axis 60, and a first radially projecting circumferential flange 76 adjacent to first roller tread surface 74. Roller 54 may include a second roller tread surface 78 extending circumferentially around second roller axis 61 and a second radially projecting circumferential flange 80 adjacent to second roller tread surface 78. In the illustrated embodiment, first roller tread surface 74 extends axially between first inside roller shell face 68 and first radially projecting circumferential flange 76, and second roller tread surface 78 extends axially between second inside roller shell face 73 and second radially projecting circumferential flange 80. Flanges 76 and 80 can contact track links 40 to limit lateral displacement of ground-engaging track 38, including track chains 42 and 44, relative to the two rollers 52 and 54 by way of contact between flanges 76 and 80 upon rollers 52 and 54 and track links 40. In other embodiments, flanges 76 and 80 could be positioned adjacent to roller shell inside faces 68 and 73. In still another embodiment flanges 76 and 80 could be provided substantially as illustrated and rollers 52 and 54 equipped with additional radially projecting circumferential flanges adjacent to inside faces 68 and 73, respectively.

Figure 4:
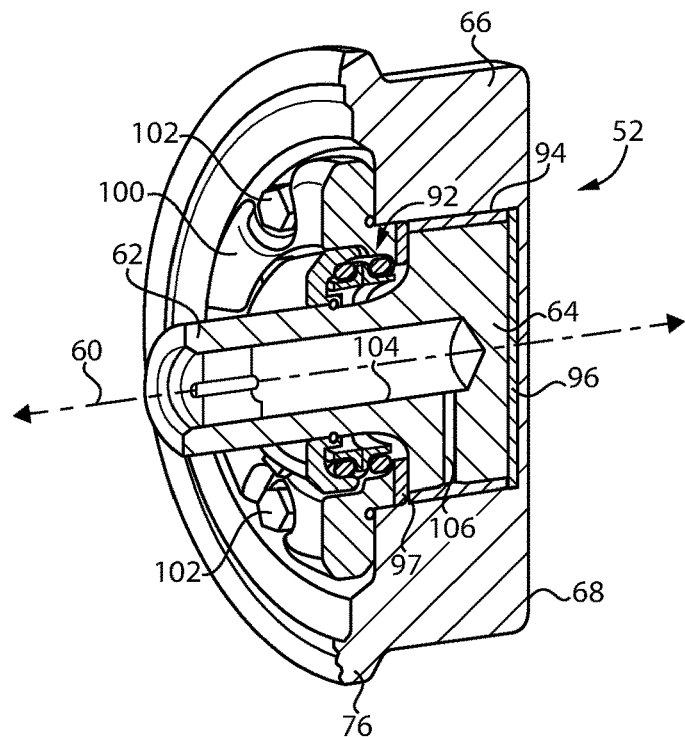
FIG. 4 is a sectioned view of an anti-backbending roller, according to one embodiment.

In a practical implementation, roller 52 and roller 54 may be substantially identical, and either one could be used in the position of the other. Accordingly, the following description, now in reference also to FIG. 4, of roller 52 can be understood by way of analogy to refer also to roller 54. First half shaft 62 may include a first enlarged shaft head 64, with first roller shell 66 being supported upon first enlarged shaft head 64. Roller 54 can be similarly or identically configured. Track roller frame assembly 15, and in particular roller 52, may also include a journal bearing 94 radially between enlarged shaft head 64 and roller shell 66. Roller 52 may also include a thrust bearing 96 axially between enlarged shaft head 64 and roller shell 66. A second thrust bearing 97 may be positioned opposite to first thrust bearing 96 in some embodiments. First half shaft 62 may also include an axially extending oil bore 104, and a radially extending cross bore 106 structured to supply lubricating oil from oil bore 104 to the various bearing surfaces. A seal ring 100 is coupled via bolts 102 to first roller shell 66.

As also shown in FIG. 2, track roller frame assembly 15 may further include a first clamping mount 84 attached to track roller frame 16 and supporting first half shaft 62. Also shown in FIG. 2 is a second clamping mount 87 also attached to track roller frame 16 and supporting second half shaft 70, which is not visible in FIG. 2. Track roller frame assembly 15, and roller 52 in particular, may also include a first face seal assembly 92 sealing between first half shaft 62 and first roller shell 66, and it will be understood that a second face seal assembly may be provided sealing between second half shaft 70 and second roller shell 72. First clamping mount 84 may include a clamp body 86 having a bore 88 formed therein that receives first half shaft 62, and a plurality of bolts 90, one of which is shown, clamping clamp body 86 to track roller frame 16. Clamping mount 87 may be analogously configured.

Figure 5:
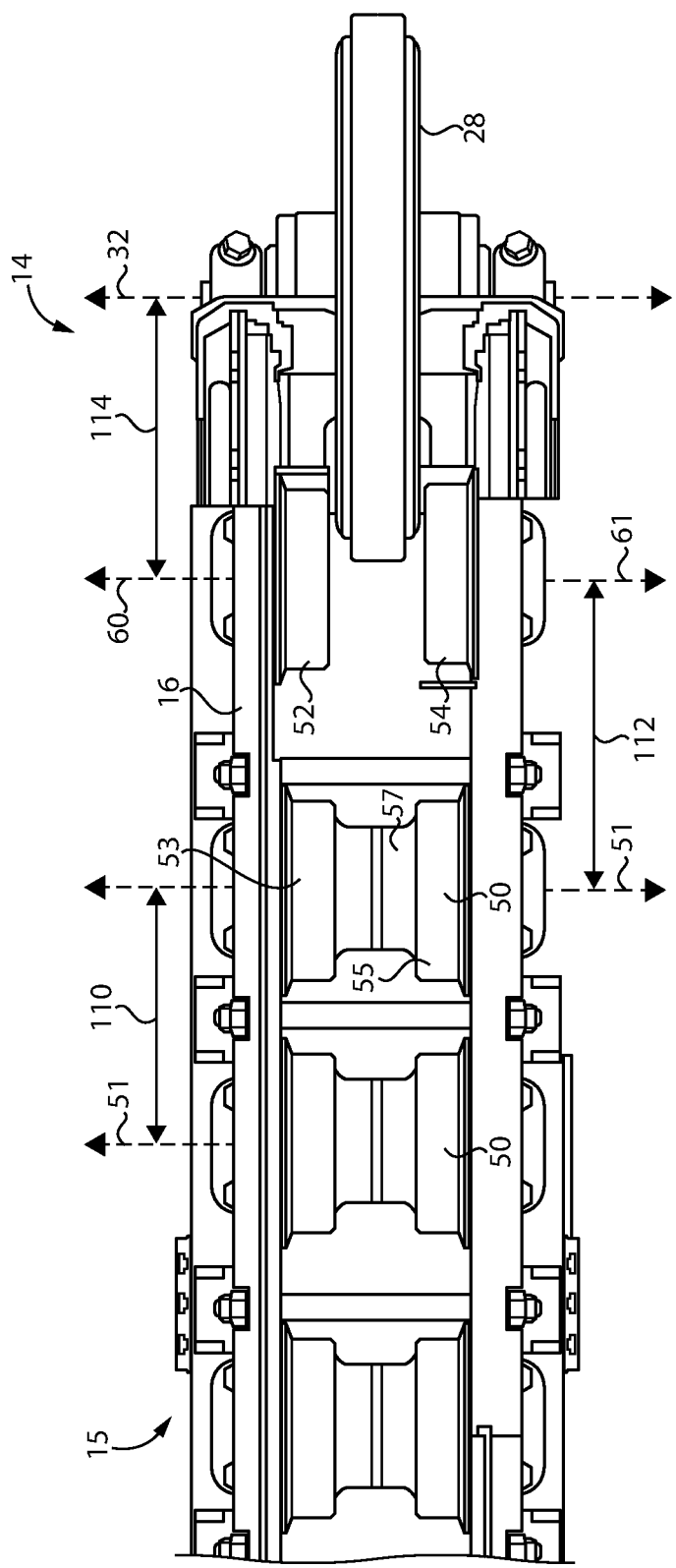
FIG. 5 is a diagrammatic view of a track roller frame assembly in a ground-engaging track system, according to one embodiment.

Referring also now to FIG. 5, there is shown a view of track system 14 and track roller frame assembly 15 in additional detail. In the illustrated embodiment, track rollers 50 may include standard track rollers supported by track roller frame 16 and distributed longitudinally along track roller frame 16 back of inboard anti-backbending roller 52 and outboard anti-backbending roller 54. A standard track roller as contemplated herein means a track roller that includes a roller shell 57 having an inboard tread surface 53 and an outboard tread surface 55 that simultaneously contact two track chains when assembled for service. Embodiments are nevertheless contemplated where non-standard track rollers, for example, cantilever-supported split track rollers similar or identical to anti-backbending rollers 52 and 54 are used, or some combination of standard track rollers and split track rollers. A roller-to-roller spacing 110 between standard track rollers 50 may be different than, for example less than, a roller-to-roller spacing 112 between a leading or forward one of standard track rollers 50 and each of anti-backbending roller 52 and anti-backbending roller 54. Roller-to-roller spacing 110 may be similar, or potentially equal to, a roller-to-idler spacing 114 between roller axes 60, 61, and idler axis 32, although the present disclosure is not thereby limited. Roller-to-roller spacing 110 is defined between roller axis 51 of standard track rollers 50 in the present example.

Figure 6:
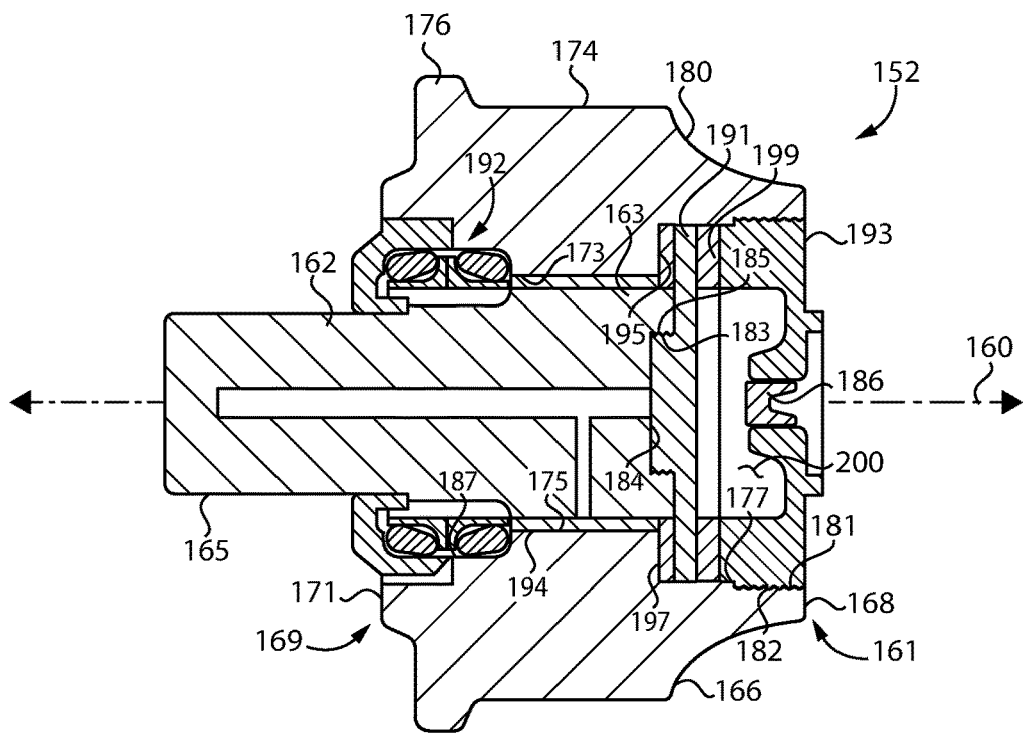
FIG. 6 is a sectioned side diagrammatic view of a roller for a ground-engaging track system, according to another embodiment.

Referring now to FIG. 6, there is shown another roller 152 suitable for use as an anti-backbending roller in a ground-engaging track system in a machine. Roller 152 can be used in a manner similar to or the same as that described with regard to other rollers discussed herein, and the foregoing description should be understood to apply by way of analogy to roller 152 except where otherwise indicated or apparent from the context. Roller 152 includes a roller shell 166 having an outer roller tread surface 174 extending circumferentially around a roller axis 160 and axially between a first roller shell axial end 161 having a roller shell inside face 168, and a second roller shell axial end 169 having a roller shell outside face 171. Roller shell 166 further includes an inner shell surface 173 extending circumferentially around roller axis 160, and forming a journal bore 175 and a thrust bore 177 extending axially between journal bore 175 and roller shell inside face 168.

Roller 152 further includes a roller shaft 162 including a shell support end 163 within journal bore 175, and a mounting end 165 projecting outwardly of second roller shell axial end 169. A face seal assembly 192 may be positioned at least partially within roller shell 166 at second roller shell axial end 169. In the illustrated embodiment, face seal assembly 192 is received in part within an axially extending recess 187 formed in roller shell 166. A radially extending circumferential flange 176 is adjacent to outer tread surface 174, and outer tread surface 174 extends axially between flange 176 and roller shell inside face 168. Analogous to the foregoing embodiments, a second flange or an alternative flange location might be used. A concave, radially inward sloping transition surface 180 extends from outer tread surface 174 to roller shell inside face 168.

Roller 152 further includes a thrust flange 191 attached to shell support end 163 of roller shaft 162. Thrust flange 191 is positioned within thrust bore 177. Also in the illustrated embodiment thrust bore 177 has a larger diameter, in radial directions, and journal bore 175 has a smaller diameter, in radial directions. Inner shell surface 173 may include an inside shoulder surface 195 transitioning between journal bore 175 and thrust bore 177. A journal bearing 194 may be positioned in roller 152 radially between shell support end 163 and inner shell surface 173. Roller 152 also includes a shell cap 193 attached to roller shell 166 and positioned at least partially within thrust bore 177. In the illustrated embodiment, shell cap 193 may be attached to roller shell 166 by way of a threaded connection formed by internal threads 181 of roller shell 166 and external threads 182 of shell cap 193. In alternative embodiments, shell cap 193 could be attached by another suitable mechanism, such as an interference fit, bolts, or welding to name a few examples. A thrust bearing 197 is trapped within roller 152, and in contact with thrust flange 191. Thrust bearing 197 may include a first thrust bearing sandwiched between thrust flange 191 and inside shoulder surface 195. Roller 152 may include a second thrust bearing trapped between thrust flange 191 and shell cap 193. Thrust flange 191 may be a piece separate from and attached to roller shaft 162. Attachment between roller shaft 162 and thrust flange 191 could be by way of a threaded connection formed by external threads 185 on thrust flange 191, and internal threads 183 on roller shaft 162.

In other embodiments an interference fit, bolts, welding, or any other suitable attachment strategy could be used. A lubricant cavity 200 may be formed in part by each of shell cap 193 and thrust flange 191. A plug 186 may be positioned in shell cap 193 for accessing, filling, et cetera, lubricant cavity 200. As noted above thrust flange 191 may be a piece separate from roller shaft 162, and could be positioned partially within an axially extending recess 184 formed in shell support end 163 of roller shaft 162. In still other embodiments a threaded connection could be formed by a protrusion of roller shaft 162 equipped with external threads mated to internal threads on a thrust flange, the thrust flange and roller shaft could be formed as a single integral piece, or any of a variety of other constructions could be used. Thrust flange 191 extends radially outward of shell support end 163. It can be seen from FIG. 6 that trapping of thrust bearings 197 and 199 between thrust flange 191 and roller shell 166 and between thrust flange 191 and shell cap 193, respectively, enables reacting of thrust loads between roller shell 166 and roller shaft 162 in inboard directions or outboard directions. Roller shaft 162 may be equipped with internal bores (not numbered), generally analogous to those of other embodiments described herein, that feed lubricating oil or the like from lubricant cavity 200 to journal bearing 194 and associated bearing surfaces.

Figure 7:
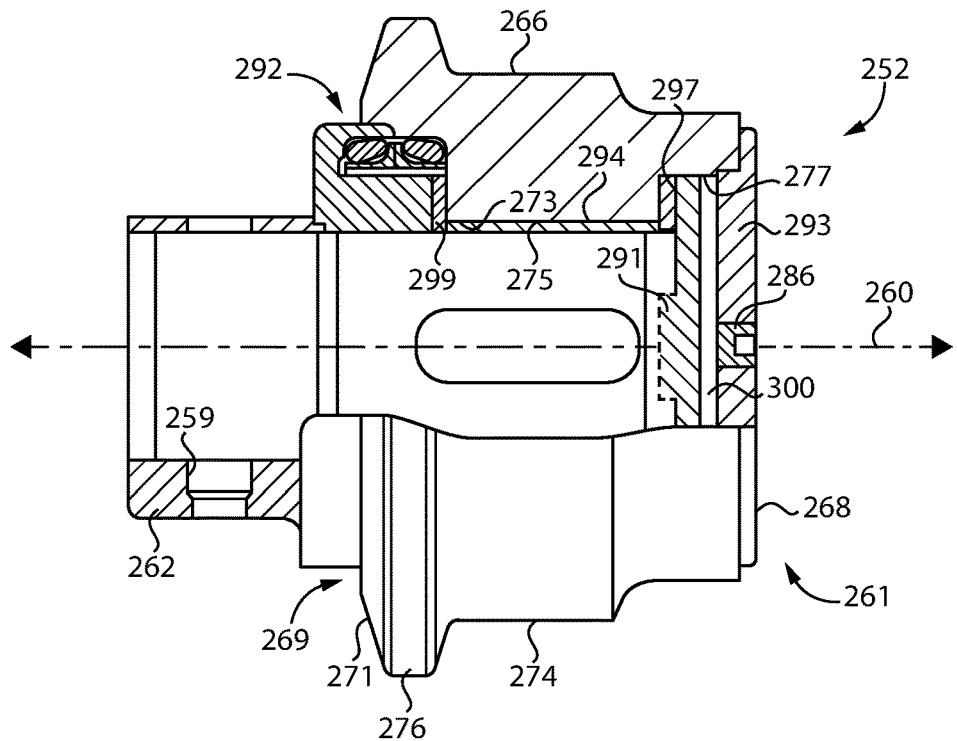
FIG. 7 is a partially sectioned side diagrammatic view of a roller for a ground-engaging track system, according to another embodiment.

Turning now to FIG. 7, there is shown a roller 252 according to another embodiment, and again structured for deploying analogously in a ground-engaging track system to other embodiments discussed herein. Roller 252 includes a roller shell 266 having an outer tread surface 274 extending circumferentially around a roller axis 260 and axially between a first roller shell axial end 261 having a roller shell inside face 268, and a second roller shell axial end 269 having a roller shell outside face 271. Roller shell 266 also includes an inner shell surface 273 extending circumferentially around roller axis 260, forming a journal bore 275 with a journal bearing 294 positioned therein, and a thrust bore 277 extending axially between journal bore 275 and roller shell inside face 268. A face seal assembly 292 may be configured similarly to other face seal assemblies discussed herein, and fluidly seals between roller shell 266 and a roller shaft 262. Face seal assembly 292 is at least partially within roller shell 266 at roller shell axial end 269. A radially extending circumferential flange 276 is formed adjacent to tread surface 274 and could be one of two flanges, or located elsewhere upon roller shell 266, consistent with alternatives to the other embodiments illustrated. A thrust flange 291 is attached to roller shaft 262 and positioned within thrust bore 277. A shell cap 293 is attached to roller shell 266 and positioned at least partially within thrust bore 277. A first thrust bearing 297 is trapped within roller 252 and in contact with thrust flange 291.

As illustrated, thrust bearing 297 is sandwiched between thrust flange 291 and roller shell 266. Thrust flange 291 can be attached to roller shaft 262 by way of any of the strategies contemplated herein, or still others, or could be formed integrally with roller shaft 262. A plug 286 is positioned within shell cap 293 to fluidly seal a lubricant cavity 300. Roller 252 may further include a dowel bore 259 oriented generally normal to roller axis 260 and extending through roller shaft 262 to receive a positioning or mounting dowel in a clamping mount assembly or a track roller frame, for instance.

Roller 252 has similarities with roller 152, and could be used interchangeably therewith, but also certain differences. Whereas roller 152 includes first and second thrust bearings 197 and 199 upon opposite axial sides of thrust flange 191, roller 252 includes only one thrust bearing operably coupled between roller shell 266 and thrust flange 291, and another thrust bearing 299 operably coupled between face seal assembly 292 and roller shell 266. Roller 252 may also differ from roller 152 with respect to roller shaft configuration. Whereas roller support end 163 of roller shaft 162 is relatively enlarged relative to mounting end 165, roller shaft 262 may be a straight shaft having a generally consistent diameter along its axial length.

INDUSTRIAL APPLICABILITY

As noted above, track system configuration including roller placement may be dependent upon many different factors, and including the need for an idler to be able to translate in response to shocks or the like during service relative to a respective track roller frame. The need to accommodate idler translation can result in a section of ground-engaging track that is relatively unsupported extending back of the idler, as standard track rollers generally are not placed where the idler is apt to collide with them. During service, interaction with a substrate material can sometimes cause that unsupported section of track to deflect upwardly or "backbend" in a manner that negatively impacts ride, or performance such as during a grading operation.

According to the present disclosure, and with continued reference back to FIG. 1, operating track system 14 can include advancing ground-engaging track 38 about idler 28, track rollers 50, and the various other rotatable track contacting elements. During advancing ground-engaging track 38, in a forward travel direction or a reverse travel direction, idler 28 is rotated about idler axis 32 and track rollers 50 are rotated about track roller axes 51, based on the advancing of ground engaging track 38. As shown in FIG. 1, machine 10 is positioned upon a substrate material 116. Deflection-sensitive section 118 extends between idler axis 32 and track roller axis 51 of the leading one of track rollers 50. A non-uniformity 120 is present in or on substrate 116. Substrate 116 could include soil, gravel, landfill waste, or any of a variety of other substrate materials. Non-uniformity 120 means a non-uniformity in at least one of a profile or a composition in underlying substrate 116. A non-uniformity in a profile could mean a bump or the like, in an otherwise more or less uniform composition of a substrate material. A non-uniformity in an underlying substrate could also be a non-uniformity in composition such as the presence of a rock in soil, a large rock amongst smaller rocks, a stump, or a variety of other obstacles. When deflection-sensitive section 118 travels upon and contacts non-uniformity 120, section 118 may be urged upwardly based on contact between section 118 and non-uniformity 120. A generally upwardly oriented load is shown in FIG. 1 by way of an arrow 122. As explained above, in certain earlier designs without anti-backbending rollers the urging upward of a deflection-sensitive track section could result in backbending. According to the present disclosure backbending of section 118 is opposed with one or more anti-backbending rollers 52 and 54 supported by track roller frame 16 and in contact with ground-engaging track 38. Contact between ground-engaging track 38 and one or more anti-backbending rollers may occur at a location longitudinally between idler axis 32 and track roller axis 51 of the leading one of track rollers 50.

The present description is for illustrative purposes only, and should not be construed to narrow the breadth of the present disclosure in any way. Thus, those skilled in the art will appreciate that various modifications might be made to the presently disclosed embodiments without departing from the full and fair scope and spirit of the present disclosure. Other aspects, features and advantages will be apparent upon an examination of the attached drawings and appended claims. As used herein, the articles "a" and "an" are intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A ground-engaging track system comprising:
a track roller frame including a front frame end and a back frame end;
an idler recoil assembly mounted to the track roller frame;
an idler supported by the idler recoil assembly at the front frame end, the idler including an idler tread surface extending circumferentially around an idler axis and being movable in fore-aft directions between a back stop position, and a forward position;
an inboard anti-backbending roller supported by the track roller frame;
an outboard anti-backbending roller supported by the track roller frame; and
an idler space is defined between the inboard anti-backbending roller and the outboard anti-backbending roller, and the idler tread surface is within the idler space at the forward position and at the back stop position of the idler;
a plurality of standard track rollers supported by the track roller frame and distributed longitudinally along the track roller frame back of the inboard anti-backbending roller and the outboard anti-backbending roller; and
wherein each of the inboard anti-backbending roller and the outboard anti-backbending roller is configured to contact only one of an inboard track chain and an outboard track chain in a track coupled to the track roller frame, and each of the plurality of standard rollers is configured to simultaneously contact both of an inboard track chain and an outboard track chain in a track coupled to the track roller frame.

2. The ground-engaging track system of claim 1 wherein the inboard anti-backbending roller and the outboard anti-backbending roller are freely rotatable relative to one another.

3. The ground-engaging track system of claim 2 wherein:
the inboard anti-backbending roller includes a first half shaft and a first roller shell supported upon the first half shaft for rotation about a first roller axis and having a first inside roller shell face; and
the outboard anti-backbending roller includes a second half shaft and a second roller shell supported upon the second half shaft for rotation about a second roller axis and having a second inside roller shell face.

4. The ground-engaging track system of claim 3 wherein the inboard anti-backbending roller and the outboard anti-backbending roller are coaxially arranged, and the idler space is a cylindrical volume extending continuously between the first inside roller shell face and the second inside roller shell face.

5. The ground-engaging track system of claim 2 wherein the first inboard anti-backbending roller includes a first roller tread surface and a first radially projecting circumferential flange adjacent to the first roller tread surface, and the outboard anti-backbending roller includes a second roller tread surface and a second radially projecting circumferential flange adjacent to the second roller tread surface.

6. The ground-engaging track system of claim 1 wherein a roller-to-roller spacing between the plurality of standard track rollers is different from a roller-to-roller spacing between a leading one of the plurality of standard track rollers and each of the inboard anti-backbending roller and the outboard anti-backbending roller.

7. The ground-engaging track system of claim 6 wherein each of the plurality of standard track rollers includes a roller shell having an inboard tread surface and an outboard tread surface.

8. The ground-engaging track system of claim 1 further comprising a ground-engaging track including an inboard track chain of coupled together track links forming an inboard track rail contacted by the inboard anti-backbending roller, an outboard track chain of coupled together track links forming an outboard track rail contacted by the outboard anti-backbending roller, and a plurality of track shoes each attached to the inboard track chain and the outboard track chain.

9. A track roller frame assembly comprising:
a track roller frame including a front frame end, a back frame end, an upper frame side, and a lower frame side;
an idler supported for rotation at the front frame end;
an inboard anti-backbending roller supported by the track roller frame and including a first half shaft cantilever-supporting a first roller shell having a first roller tread surface and a first roller shell inside face, for rotation about a first roller axis;
an outboard anti-backbending roller supported by the track roller frame and including a second half shaft cantilever-supporting a second roller shell having a second roller tread surface and a second roller shell inside face, for rotation about a second roller axis;
the first roller shell inside face and the second roller shell inside face define an idler space extending in inboard-outboard directions between the inboard anti-backbending roller and the outboard anti-backbending roller, and the idler is positioned partially within the idler space; and
wherein the idler space is a volume extending continuously between the first inside roller shell face and the second inside roller shell face.

10. The track roller frame assembly of claim 9 wherein the inboard anti-backbending roller and the outboard anti-backbending roller are coaxially arranged.

11. The track roller frame assembly of claim 9 wherein the inboard anti-backbending roller includes a first radially projecting circumferential flange, and the outboard anti-backbending roller includes a second radially projecting circumferential flange.

12. The track roller frame assembly of claim 11 wherein the first roller tread surface extends axially between the first inside roller shell face and the first radially projecting circumferential flange, and the second roller tread surface extends axially between the second inside roller shell face and the second radially projecting circumferential flange.

13. The track roller frame assembly of claim 9 further comprising a first clamping mount attached to the track roller frame and supporting the first half shaft, a first face seal assembly sealing between the first half shaft and the first roller shell, a second clamping mount attached to the track roller frame and supporting the second half shaft, and a second face seal assembly sealing between the second half shaft and the second roller shell.

14. The track roller frame assembly of claim 13 wherein each of the first half shaft and the second half shaft includes an enlarged shaft head, and further comprising a journal bearing radially between each respective enlarged shaft head and roller shell, and a thrust bearing axially between each respective enlarged shaft head and roller shell.

15. A method of operating a ground-engaging track system comprising:
advancing a ground-engaging track of coupled together track links attached to track shoes about an idler and track rollers coupled to a track roller frame;
rotating the idler about an idler axis and rotating the track rollers about track roller axes, based on the advancing of the ground-engaging track;
urging a deflection-sensitive section of the ground-engaging track extending between the idler and a leading one of the track rollers upwardly based on contact between the deflection-sensitive section and a non-uniformity in at least one of a profile or a composition of an underlying substrate;

opposing backbending of the deflection-sensitive section with an anti-backbending roller supported by the track roller frame in contact with the ground-engaging track at a location longitudinally between the idler axis and the track roller axis of the leading one of the track rollers;

contacting each of the plurality of track rollers simultaneously to each of two track chains of the ground-engaging track during the advancing the ground-engaging track; and contacting the anti-backbending roller to only one of the two track chains during the opposing backbending of the deflection-sensitive section.

16. The method of claim 15 wherein the opposing of the backbending of the deflection-sensitive section further includes opposing the backbending with two anti-backbending rollers cantilever-supported upon a track roller frame in facing relation to one another, such that an idler space receiving the idler extends continuously therebetween.

17. The method of claim 16 further comprising limiting lateral displacement of the ground-engaging track relative to the two anti-backbending rollers by way of contact between radially projecting circumferential flanges upon the two anti-backbending rollers and track links in the ground-engaging track.

* * * * *